(12) United States Patent
Zeichfüssl

(10) Patent No.: US 10,903,707 B2
(45) Date of Patent: Jan. 26, 2021

(54) SYNCHRONOUS RELUCTANCE MACHINE

(71) Applicant: SIEMENS AKTIENGESELLSCHAFT, Munich (DE)

(72) Inventor: Roland Zeichfüssl, Ruhstorf a. d. Rott (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/495,930

(22) PCT Filed: Mar. 1, 2018

(86) PCT No.: PCT/EP2018/055009
§ 371 (c)(1),
(2) Date: Sep. 20, 2019

(87) PCT Pub. No.: WO2018/172033
PCT Pub. Date: Sep. 27, 2018

(65) Prior Publication Data
US 2020/0136451 A1   Apr. 30, 2020

(30) Foreign Application Priority Data
Mar. 21, 2017   (EP) .................... 17162103

(51) Int. Cl.
*F03D 9/00*   (2016.01)
*H02P 9/04*   (2006.01)
(Continued)

(52) U.S. Cl.
CPC ............. *H02K 1/325* (2013.01); *F03D 9/25* (2016.05); *F03D 80/60* (2016.05); *F03D 80/80* (2016.05); *H02K 1/246* (2013.01); *H02K 7/1838* (2013.01)

(58) Field of Classification Search
CPC .............................. H02K 1/246; H02K 1/325
See application file for complete search history.

(56) References Cited

U.S. PATENT DOCUMENTS

| | | | |
|---|---|---|---|
| 8,362,661 B2 * | 1/2013 | DeBlock | H02K 1/32 310/59 |
| 8,686,608 B2 * | 4/2014 | Lendenmann | H02K 1/325 310/61 |

(Continued)

FOREIGN PATENT DOCUMENTS

| | | |
|---|---|---|
| CN | 1412916 A | 4/2003 |
| CN | 1564427 A | 1/2005 |

(Continued)

OTHER PUBLICATIONS

PCT International Search Report and Written Opinion of International Searching Authority dated Feb. 25, 2019 corresponding to PCT International Application No. PCT/EP2018/055009 filed Mar. 1, 2018.

*Primary Examiner* — Tulsidas C Patel
*Assistant Examiner* — Thomas K Quigley
(74) *Attorney, Agent, or Firm* — Henry M. Feiereisen LLC

(57) ABSTRACT

A synchronous reluctance machine includes a stator and a rotor spaced apart from the stator by an air gap. The rotor is rotatably mounted about an axis and has laminations arranged axially behind one another. Each lamination has an anisotropic magnetic structure formed by flux blocking sections and flux conducting sections, wherein the flux blocking sections and the flux conducting sections form poles of the rotor. The flux blocking sections form axial channels, wherein in at least some flux blocking sections permanent magnets are provided that do not completely occupy the respective flux blocking section and thus allow axial airflow in all flux blocking sections. The laminated (Continued)

core of the rotor is axially subdivided into at least two component laminated cores, with radial cooling gaps formed between the poles in the region of the q axis as viewed in circumferential direction and between the component laminated cores as viewed axially.

20 Claims, 16 Drawing Sheets

(51) Int. Cl.
*H02K 1/32* (2006.01)
*F03D 9/25* (2016.01)
*F03D 80/60* (2016.01)
*F03D 80/80* (2016.01)
*H02K 1/24* (2006.01)
*H02K 7/18* (2006.01)

(56) References Cited

U.S. PATENT DOCUMENTS

| | | | | |
|---|---|---|---|---|
| 9,800,103 B2* | 10/2017 | Buttner | | H02K 1/246 |
| 9,985,500 B2* | 5/2018 | Rippel | | H02K 9/197 |
| 10,284,032 B2* | 5/2019 | Buttner | | H02K 15/02 |
| 10,404,113 B2* | 9/2019 | Buttner | | H02K 1/246 |
| 10,727,707 B2* | 7/2020 | Ballweg | | H02K 1/28 |
| 2002/0070620 A1 | 6/2002 | Naito et al. | | |
| 2003/0107288 A1 | 6/2003 | Takita et al. | | |
| 2011/0181137 A1 | 7/2011 | Kori et al. | | |
| 2012/0217756 A1 | 8/2012 | Balzer et al. | | |
| 2012/0299403 A1 | 11/2012 | Stahlhut et al. | | |
| 2013/0099607 A1* | 4/2013 | Lendenmann | | H02K 1/32 310/46 |
| 2015/0372546 A1* | 12/2015 | Buttner | | H02K 1/246 310/216.107 |
| 2016/0056674 A1* | 2/2016 | Buettner | | H02K 15/02 310/46 |
| 2016/0329845 A1 | 11/2016 | Jannot et al. | | |
| 2016/0344274 A1* | 11/2016 | Jurkovic | | H02K 1/2766 |
| 2016/0372983 A1* | 12/2016 | Okochi | | H02K 1/32 |
| 2016/0380492 A1 | 12/2016 | Kawasaki et al. | | |
| 2017/0012481 A1* | 1/2017 | Ballweg | | H02K 15/028 |
| 2018/0083500 A1* | 3/2018 | Buttner | | H02K 17/165 |
| 2018/0123409 A1* | 5/2018 | Rogginger | | H02K 9/19 |
| 2019/0027997 A1* | 1/2019 | Zeichfussl | | H02K 1/12 |

FOREIGN PATENT DOCUMENTS

| | | |
|---|---|---|
| CN | 105830308 A | 8/2016 |
| CN | 105900317 A | 8/2016 |
| DE | 10 2009 051 651 B4 | 1/2012 |
| DE | 10 2012 210 120 A1 | 12/2013 |
| DE | 10 2016 208 042 A1 | 11/2016 |
| EP | 2 403 115 A1 | 1/2012 |
| EP | 2 528 197 A2 | 11/2012 |
| EP | 2 589 132 B1 | 1/2014 |
| EP | 3 136 549 A1 | 3/2017 |
| JP | 2011254578 A | 12/2011 |
| JP | 2014183602 A | 9/2014 |
| WO | WO 2015-025648 A1 | 2/2015 |

* cited by examiner

SYNCHRONOUS RELUCTANCE MACHINE

CROSS-REFERENCES TO RELATED APPLICATIONS

This application is the U.S. National Stage of International Application No. PCT/EP2018/055009, filed Mar. 1, 2018, which designated the United States and has been published as International Publication No. WO 2018/172033 A1 and which claims the priority of European Patent Application, Serial No, 17162103.0, filed Mar. 21, 2017, pursuant to 35 U.S.C. 119(a)-(d).

BACKGROUND OF THE INVENTION

The invention relates to a synchronous reluctance machine. In particular a motor or a generator of a wind power plant comprising a stator and a rotor, which is spaced apart from said stator by an air gap and which is rotatably mounted about an axis, with an anisotropic magnetic structure formed by flux blocking sections arranged substantially axially one behind the other.

The invention also relates to a wind power plant with a generator embodied in this manner.

As a rule, asynchronous machines with squirrel cage rotors or synchronous machines are used as dynamo-electric machines, i.e. motors or generators with powers of a few 100 kW and greater. However, such machines have a rotor that is complex to manufacture with a squirrel cage or a pole winding.

Machines in this power class generally require the rotor to be cooled since the losses arising there are no longer able to be dissipated solely by convection. Thus, the rotor is usually cooled by cooling air, which is generated by self-ventilation or outside ventilation. Moreover, the stator of such a machine has to be supplied uniformly with cooling air over its entire axial length. The above-described machines frequently require a higher power factor in order to minimize the proportion of reactive power that has to be made available to operate the machine.

With dynamo-electric machines of this power class, a distinction is substantially made between two types of primary cooling with air. On the one hand, there are machines through which air only flows in an axial direction, such as those described for example in DE 10 2009 051 651 B4. Here, a circuit of this kind is combined with water-jacket cooling of the laminated core of the stator.

Furthermore, there are dynamo-electric machines in which the cooling air also flows radially through the machine, specifically through the stator. In order to enable this, stator and rotor laminated cores are interrupted by radial cooling slots. As a result, the surface onto which the air flows can be substantially enlarged.

For example, DE 10 2012 210 120 A1 describes a dynamo-electric machine with radial cooling slots in the stator and rotor and a separate cooling circuit for the winding heads.

EP 2 403 115 A1 discloses a concept with radial cooling slots for a permanently excited synchronous machine.

Compared to the machines mentioned above, a synchronous reluctance machine has the drawback that the power factor is relatively low—about 0.7 to 0.75. For this reason, this type of machine is hardly used at all in the power class of a few 100 kW and greater.

EP 2 589 132 B1 describes, for example, the cooling of a reluctance machine with a smaller size and power. In this arrangement, the cooling air flows axially through flux barriers of the rotor. The stator is fully laminated in the axial direction.

This type of cooling is inter alia not suitable for machines with a greater power since the ratio of volume to surface is too low and thus no sufficient cooling surface is available.

Proceeding therefrom, the invention is based on the object of providing a synchronous reluctance machine, in particular for a higher power class of a few 100 kW and greater, which, with sufficient cooling, provides a comparatively high power factor at different loads. Furthermore, the synchronous reluctance machine is to be suitable for use in wind power plants.

SUMMARY OF THE INVENTION

This object is achieved by a synchronous reluctance machine, in particular a motor or generator having a power greater than 300 kW, comprising a stator and a rotor which is spaced apart from said stator by an air gap, is rotatably mounted about an axis and of which the laminations that are arranged axially one behind the other each have an anisotropic magnetic structure that is formed by flux blocking sections and flux conducting sections and wherein the flux blocking sections and flux conducting sections form poles of the rotor, wherein said flux blocking sections form axially extending channels, wherein, in at least some flux blocking sections, permanent magnets are provided that do not completely occupy the respective flux blocking section and thus allow an axial airflow in all flux blocking sections, wherein the laminated core of the rotor is axially subdivided into at least two component laminated cores, wherein in each case there are radial cooling gaps between the poles in the region of the q axis as viewed in the circumferential direction and between the component laminated cores as viewed axially.

As a result of the inventive structure of the synchronous reluctance machine with permanent magnets in flux barriers, the power factor is now increased at different working points, and the cooling is improved. Moreover, the difference in the inductance between the d and q axis of the rotor of the synchronous reluctance machine is increased, which ultimately improves the power factor of the synchronous reluctance machine. As a result of the increased power factor, the achievable torque is also increased.

The permanent magnets only extend over a part of the flux barriers thus enabling an axial cooling air flow in the remaining regions of these flux barriers provided with permanent magnets.

Herein, in a power class of 300 kW and greater, a power factor of about 0.8 or greater is possible. The proportion of reactive power that has to be provided to operate the machine can thus be reduced—this is of particular advantage in converters in wind power plant generators.

Therefore, viewed in the axial direction, the rotor comprises at least two component laminated cores, between which radial cooling gaps are present. Therefore, each flux blocking section has at least one radial cooling gap within its axial course in the rotor.

Advantageously, the intermediate elements are embodied as magnetically conductive parts and thus an additional magnetic flux can &so be conveyed in the rotor in these sections. This also increases the inductance in the d axis. These intermediate elements as magnetically conductive parts are advantageously manufactured with the same tools, for example punching tools, as the further laminations of the rotor. In this case, they are also embodied as laminations. Additional machining steps on the intermediate elements, for example punching or cutting, can enable additional options, larger cutouts, spacers, elements with a fan effect to be provided in these laminations.

However, the magnetically conductive parts of the intermediate elements can be embodied not only as laminations, but also as solid parts. This is in particular advantageous when the magnetically conductive parts no longer extend as far as the air gap of the synchronous reluctance machine since eddy current losses are to be expected, particularly on the surface of the rotor.

At least in the region of the d axis, the laminated core of the rotor is embodied as axially continuous. Flux barriers flanking the d axis are additionally present depending upon the axial position in the laminated core of the reluctance rotor.

Herein, in further embodiments, the radial extent of the intermediate elements, i.e. the laminations of the d axis, can be embodied as radially reduced in the region of the cooling gaps in order to reduce eddy current losses. Herein, the radial reduction of the intermediate elements is oriented to the radial depth of the respective flux barrier.

Advantageously, the difference in the inductances of the d and q axis of the rotor can be additionally increased when the laminated core of the rotor is embodied axially about 10% longer than that of the stator. This results in a further improvement in the power factor.

Depending on the flux blocking sections, a now axially conveyed cooling air flow, which enters the rotor, is optionally also guided past the permanent magnets and completely or at least partially diverted radially into radial cooling channels. These bulkhead elements can, for example, form one or more individual laminations, which are preferably not magnetically conductive. They are, therefore, also not provided with permanent magnets. This reduces scatter losses.

As an alternative thereto, the bulkhead elements can also be provided as laminations with cutouts with a closure of the flux blocking sections, which preferably in turn consists of a non-magnetically conductive material, such as, for example, plastic.

A cooling air flow entering the rotor axially via the respective flux blocking sections is subsequently—depending upon the position of the flux blocking section—diverted radially in the direction of the air gap of the synchronous reluctance machine. Thereafter, this cooling air flow enters radial cooling slots of the stator and exits again at the rear side of the laminated stator core.

In one embodiment, the radial cooling slots of the stator are arranged at least partially over the radial cooling slots of the rotor.

In a further embodiment, the radial cooling slots of the stator are in no case arranged over the cooling slots of the rotor. They are thus located at different axial positions.

Thus, both the rotor and the laminated core of the stator are cooled efficiently. On the back of the laminated stator core, i.e. on the outer side of the stator—if the synchronous reluctance machine is embodied as an internal rotor—the cooling air can be collected and conveyed to one or both exhaust-air side winding heads, wherein on the way thereto and/or therefrom, the heated cooling air flow is cooled back down by means of a heat exchanger.

With this inventive reluctance machine, it is in principle advantageous for at least part of the cooling air that has been cooled back down by the heat exchanger to be conveyed directly to the rotor and hence also to the permanent magnets. This avoids premature heating of this re-cooled cooling air due to stator losses. As a result, the permanent magnets are optimally cooled thus further increasing the efficiency of this reluctance machine.

BRIEF DESCRIPTION OF THE DRAWING

The invention and further advantageous embodiments of the invention will be explained in more detail with reference to basic diagrams of exemplary embodiments, which show.

DETAILED DESCRIPTION OF PREFERRED EMBODIMENTS

Figure 1:
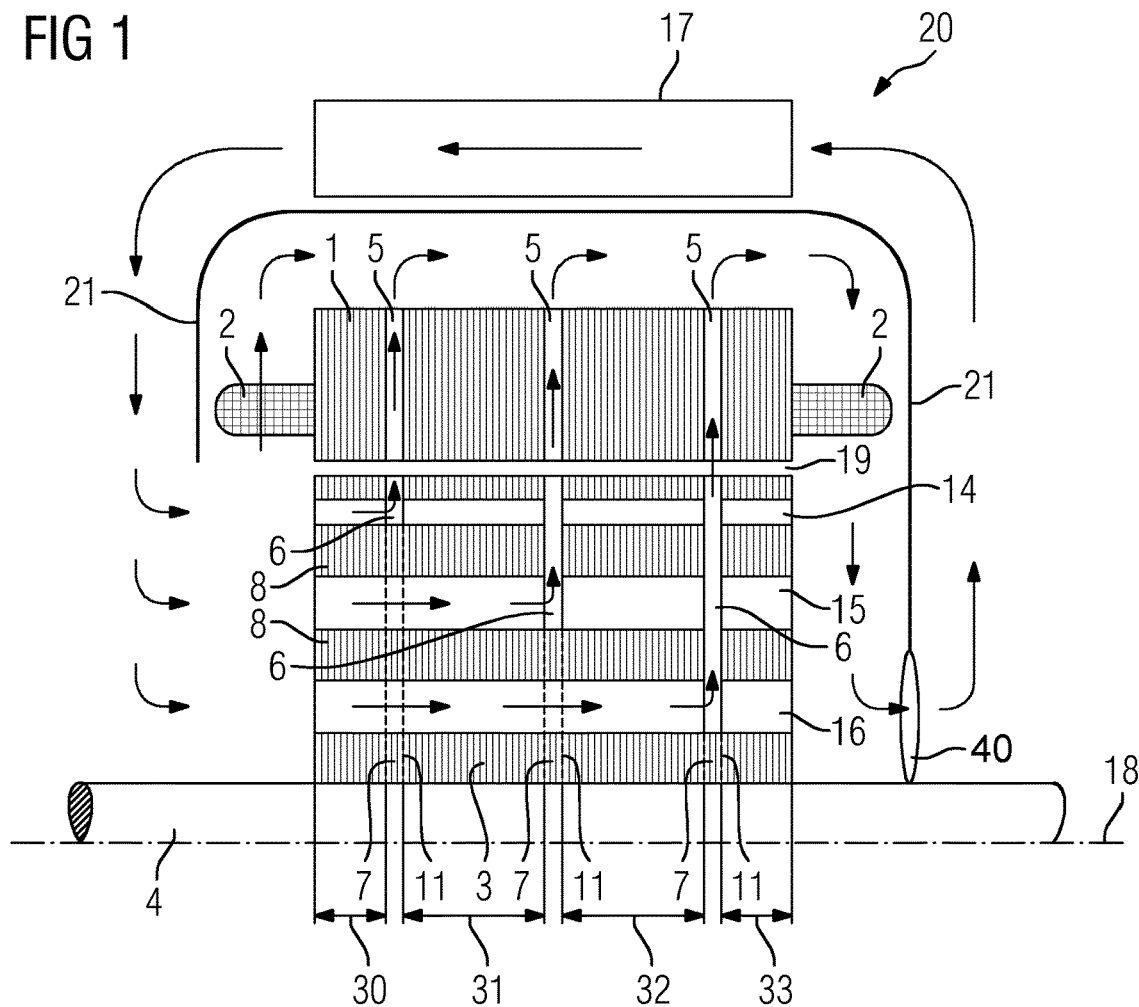
FIG. 1 a part longitudinal section of a synchronous reluctance machine.

FIG. 1 shows, in a part longitudinal section, a synchronous reluctance machine 20 comprising a stator 1 with a winding head 2 on each of its axial end faces each of which winding heads belongs to a winding system, not shown in greater detail, which is embedded in substantially axially extending grooves of the stator 1.

The stator 1 is spaced apart from a rotor 3 by an air gap 19, wherein the rotor 3 is connected in a torsion-proof manner to a shaft 4 and mounted rotatably about an axis 18.

The rotor 3 is embodied as a four-pole reluctance rotor, wherein, as viewed in the circumferential direction, flux blocking sections 14, 15, 16 and intermediate flux conducting sections 8 form four poles. In this exemplary embodiment, viewed in the radial direction, three flux blocking sections 14, 15, 16 are present.

The inventive concept is not restricted to a four-pole synchronous reluctance machine 20 but can also be transferred to two-pole, six-pole, eight-pole machines etc.

The stator 1, which is embodied as a laminated core, contains axial and/or in particular radial cooling channels 5, which, in accordance with this exemplary embodiment, are radially aligned with radial cooling channels 6 or cooling gaps of the rotor 3.

The radial alignment of the cooling channels 6 of the rotor 3 with the cooling channels 5 of the stator 1 is advantageous for the electromagnetics since more flux is transmitted from the rotor 3 to the stator 1.

The axial offset of the cooling channels 6 of the rotor 3 with respect to the cooling channels 5 of the stator 1 results in improved cooling of the entire reluctance machine while simultaneously reducing air noise.

The radial cooling channels 6 of the rotor create component laminated cores 30, 31, 32, 33 of the rotor 3, which are each spaced apart by intermediate elements 7 at least in the region of the q axis.

The radial cooling channels 5 of the stator 1 and the radial cooling channels 6 of the rotor 3 differ in their number and axial positioning in the axial course of the respective laminated core of the stator 1 and the rotor 3. Radial alignment of the cooling channels 5, 6 either does not occur at all or only occurs with a few predetermined cooling channels 5, 6.

The flux blocking sections 14, 15, 16 form substantially axially extending cooling channels through which a cooling air flow can be conveyed. As will be demonstrated later, permanent magnets 22 are arranged in these flux blocking sections 14, 15, 16 but said permanent magnets still allow an axial cooling air flow since they either do not occupy these flux blocking sections 14, 15, 16 at all or only occupy them partially.

Depending on the embodiment of these bulkhead elements 11, accordingly designed bulkhead elements 11 can now enable the topmost flux blocking section 14 or the middle flux blocking section 15 or the lowest flux blocking section 16 to be influenced in the course of its coolant flow and coolant throughput. Herein, either the entire axially-extending cooling air flow located in one of the flux blocking sections 14, 15, 16 is diverted in the region of the intermediate element 7 and conveyed radially via the air gap 19 optionally into a cooling channel 5 of the stator 1 corresponding thereto or only a part of the cooling air flow is diverted radially in the region of the intermediate element 7.

Figure 25:
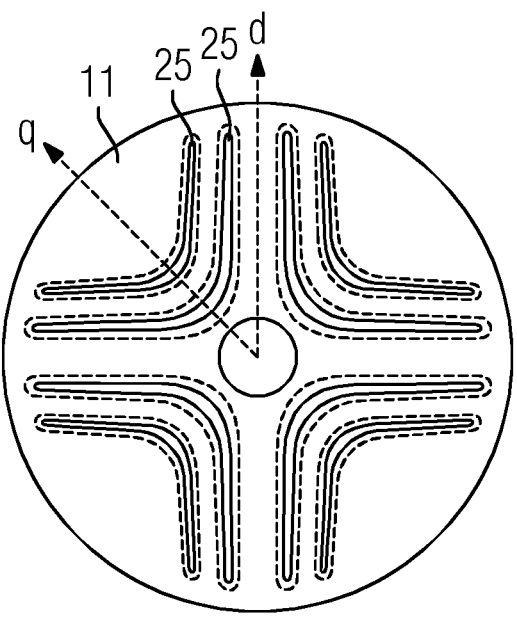
Figure 26:
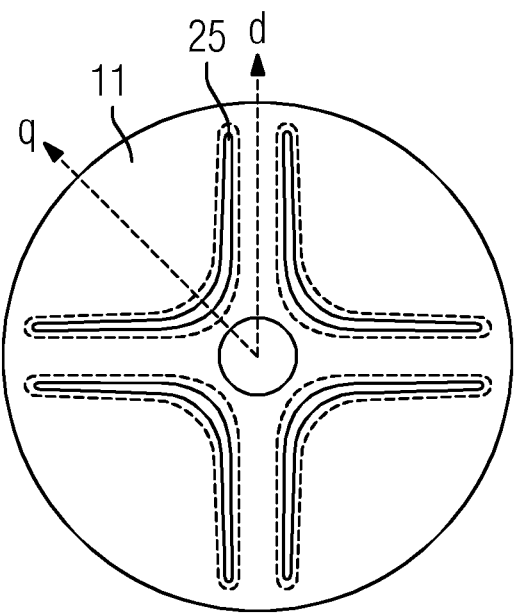
Figure 27:
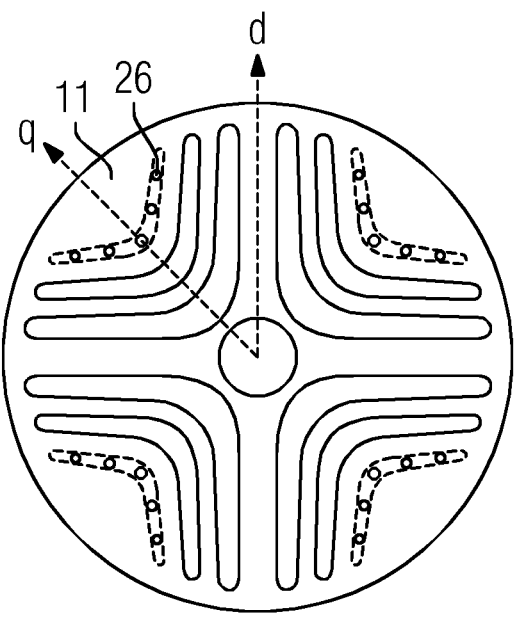
Figure 28:
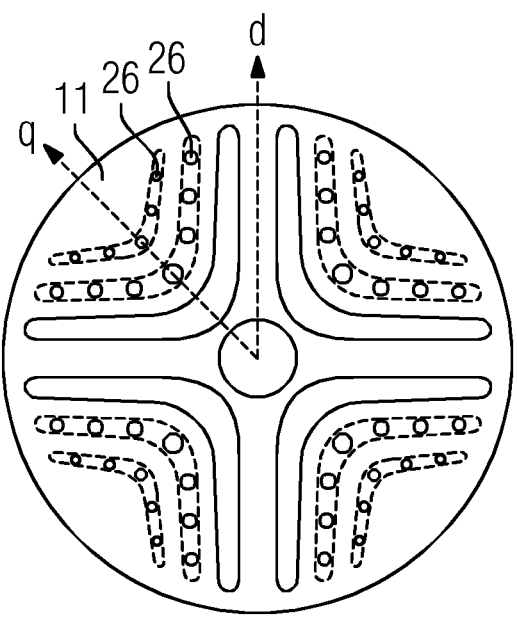

If may be necessary for an axially-extending flux barrier also to "supply" two or more of its radial cooling gaps 6 with cooling air as uniformly as possible. To this end, the through-openings 25, 26 in the bulkhead openings 11 in accordance with FIG. 25, 26 are dimensioned appropriately for the flow in that a plurality of holes 26 or a reduced radial height or tapering 25 of the flux barrier 11 is provided for each flux barrier 11.

Advantageously, the bulkhead elements 11 are also embodied as, preferably non-magnetic, laminations. The intermediate elements 7 are provided as electromagnetically conductive parts in order thereby also to enlarge the magnetically conductive part of the rotor 1, in particular in the region of the d axis, which additionally improves the power factor of the synchronous reluctance machine 20.

Herein, it is also possible for permanent magnets 22 to be arranged in the intermediate elements 7 corresponding to the respective arrangement in the flux blocking sections 14, 15, 16 in accordance with FIGS. 3 to 12.

FIG. 1 shows a single-inlet synchronous reluctance machine 20, wherein a cooling air flow only enters the machine, in particular the rotor 3, from one side. Independently of whether the cooling air now exits the stator 1 radially and/or the stator axially and/or the rotor 3 axially, a heat exchanger 17, which cools the cooling air back down to predetermined temperature values, can be located downstream in flow terms following the heating-up in the laminated cores of the stator 1 and rotor 3. Advantageously, herein, a frequency converter, not shown in more detail, the thermal behavior of which can also be influenced by an additional or the same heat exchanger 17 is also cooled down.

Schematically depicted diversion elements 21 convey the cooling air, optionally driven by a fan 40, through the heat exchanger 17. The heat exchanger 17 is not mandatorily arranged radially above the stator 1. The heat exchanger 17 can, for example, also be located axially on the end faces of the synchronous reluctance machine 20.

Figure 2:
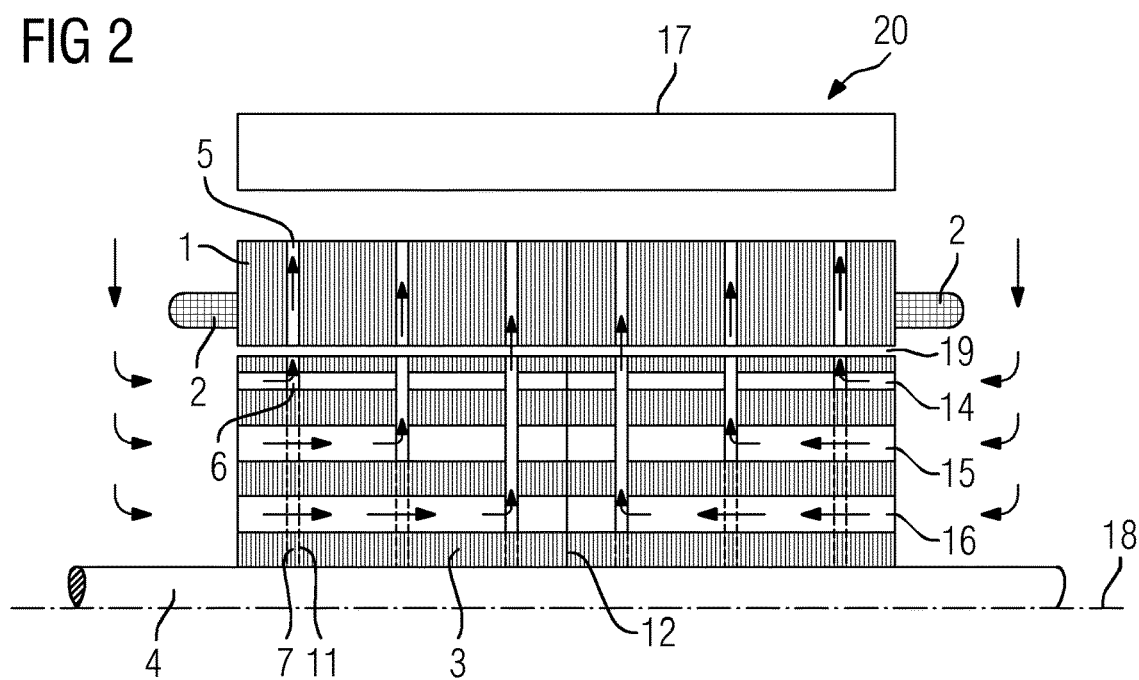
FIG. 2 a part longitudinal section of a further synchronous reluctance machine.
Figure 3:
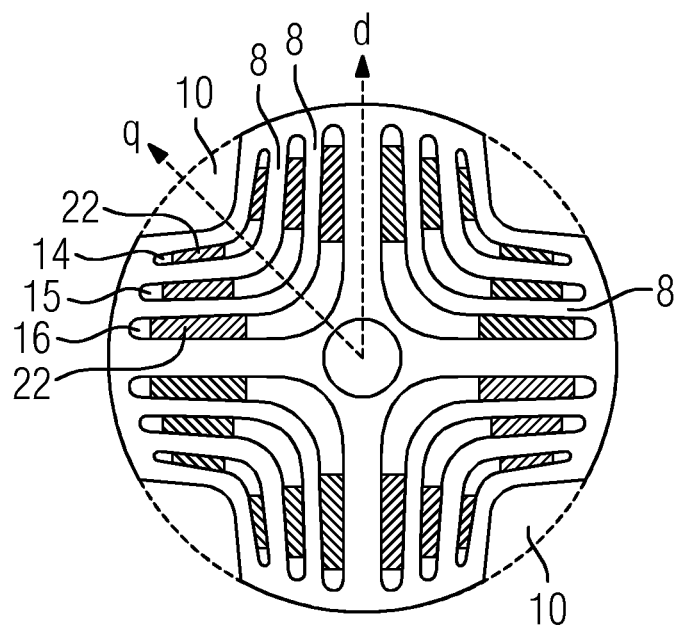
FIGS. 3 to 12 sections through laminations of the component laminated cores of the rotor fitted with permanent magnets, FIGS. 13 to 15 sections through laminations of the intermediate elements of the rotor, FIGS. 16 to 18 sections through laminations of the intermediate elements of the rotor with fan blades, FIGS. 19 to 21 sections through laminations of the bulkhead elements of the rotor, FIGS. 22 to 24 sections through laminations of the bulkhead elements of the rotor with closures, FIGS. 25 to 26 sections through laminations of the bulkhead elements of the rotor with tapered openings, FIGS. 27 to 29 sections through laminations of the bulkhead elements of the rotor with part openings, FIGS. 30 to 31 sections through laminations of the component laminated cores with reinforcement.
Figure 4:
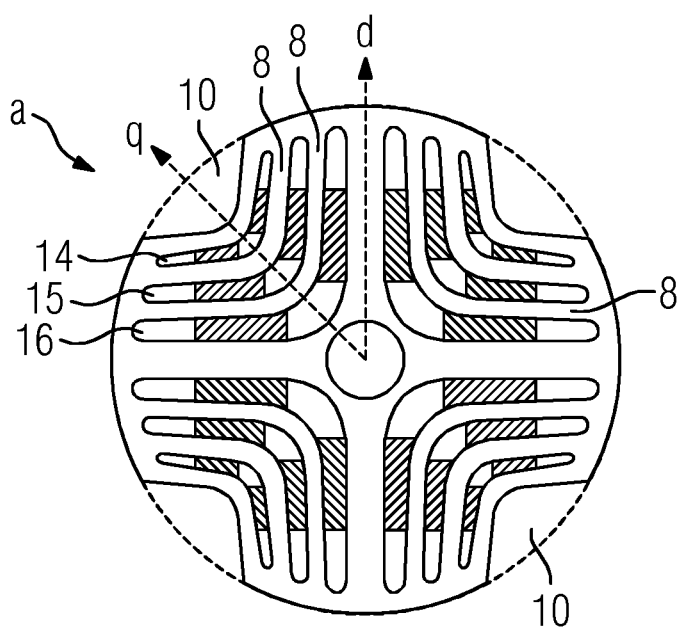
Figure 5:
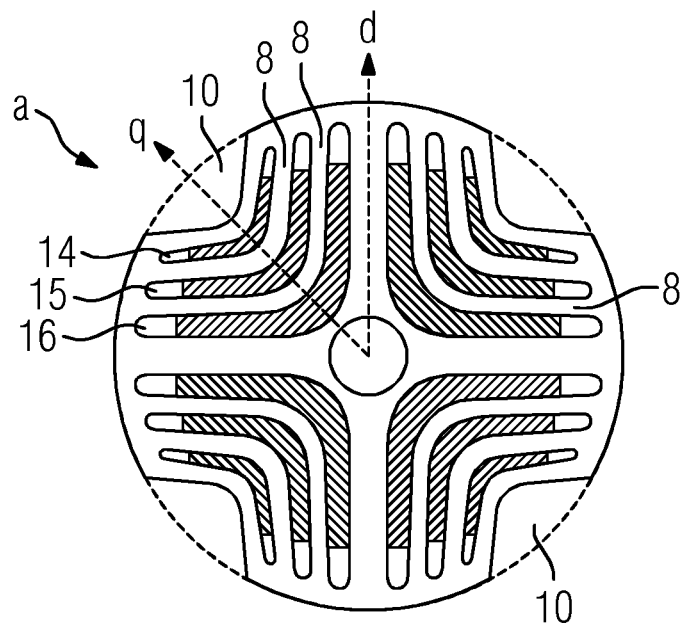
Figure 6:
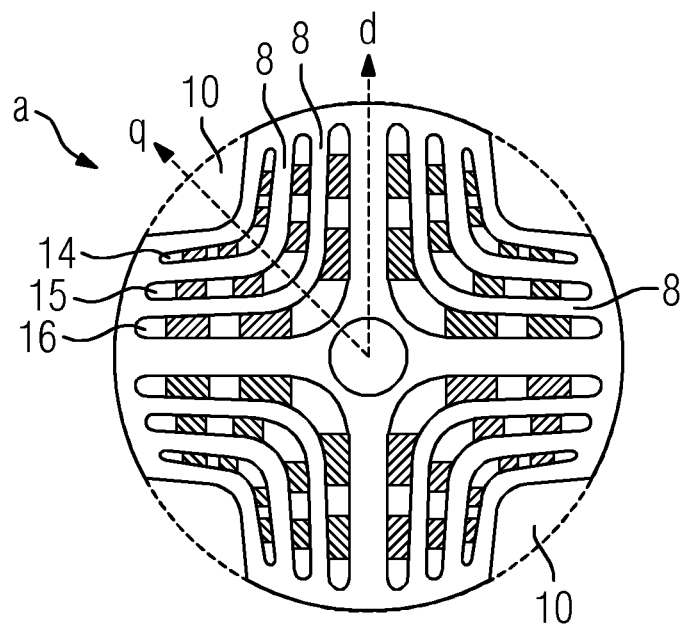
Figure 7:
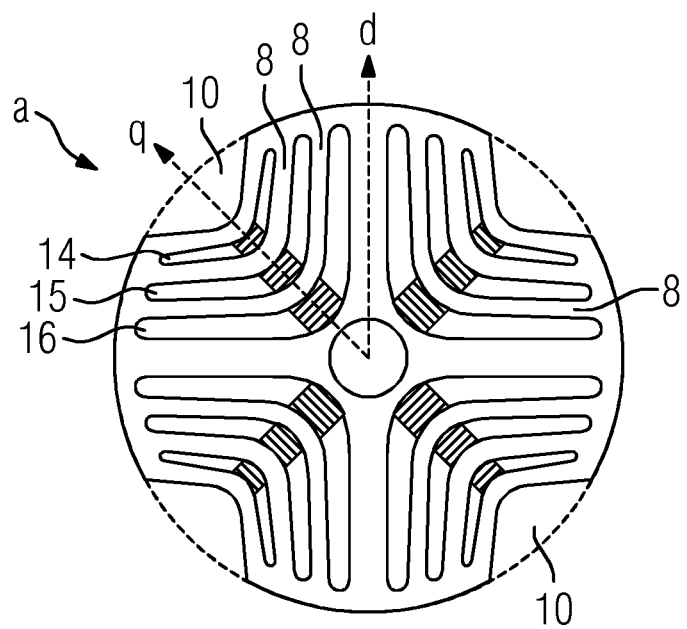
Figure 8:
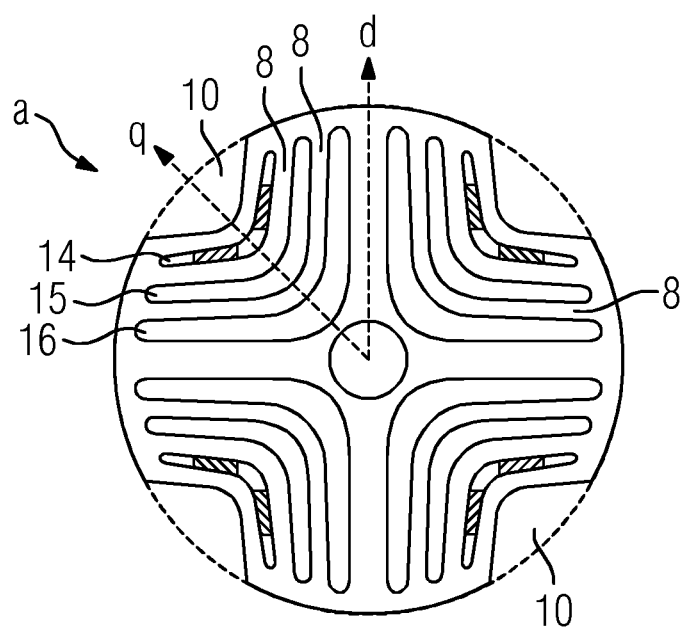
Figure 9:
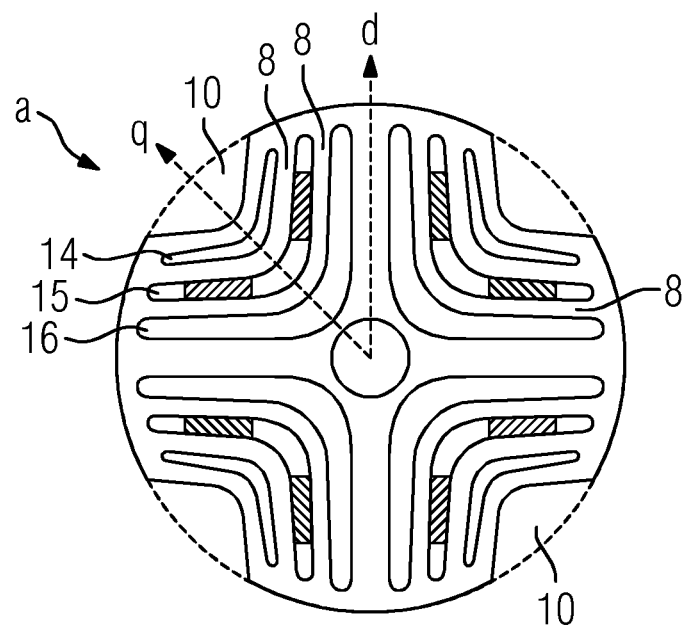
Figure 10:
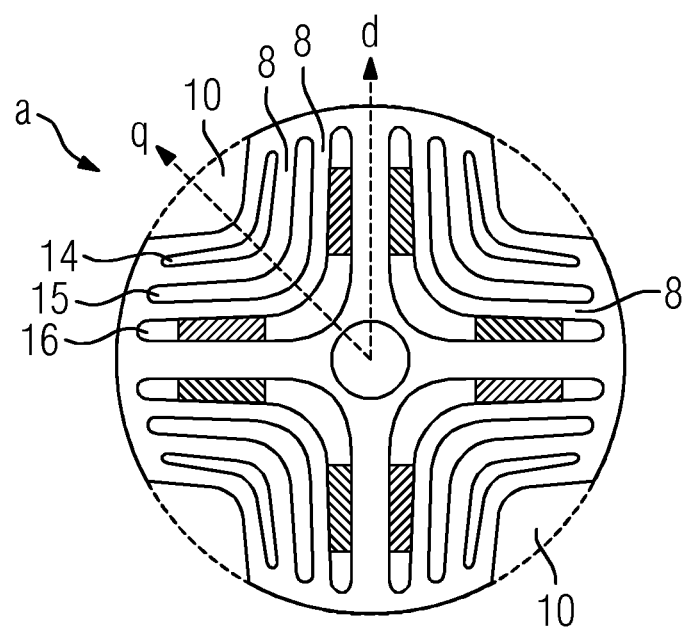
Figure 11:
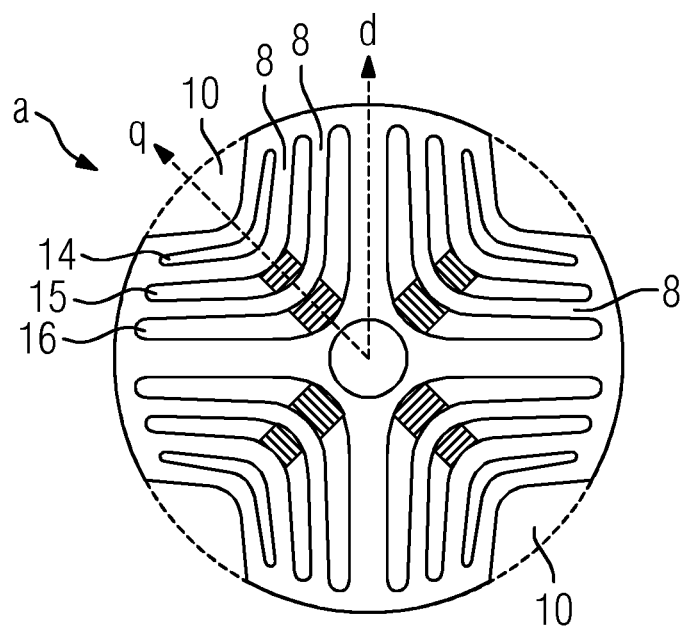
Figure 12:
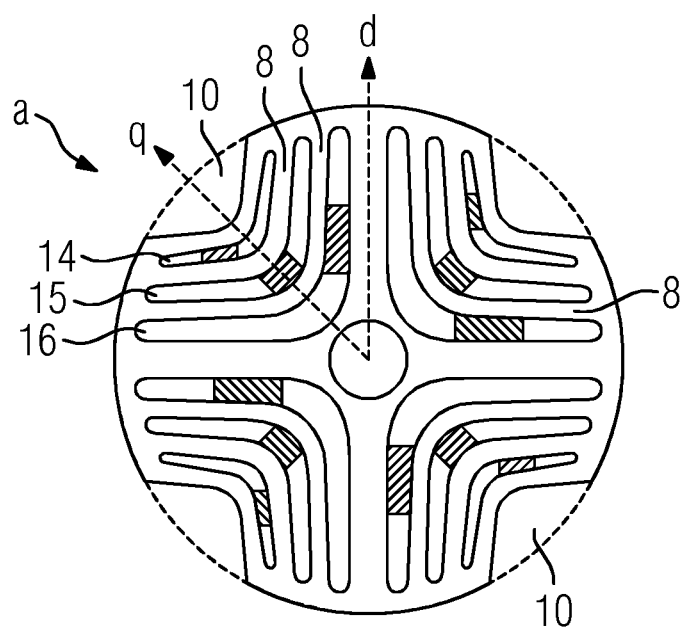

FIG. 2 shows a synchronous reluctance machine 20 embodied with two inlets, i.e. a cooling air flow enters the rotor 3 via the flux blocking section 14, 15, 16 from both one and the other axial end face of the rotor 3. As explained above for the single-inlet machine in accordance with FIG. 1, due to the structural design, the diversion of the cooling air in the flux blocking sections 14, 15, 16 takes place in the same or a similar manner.

To separate the two cooling air flows to be moved toward each other, a partition in the form of a continuous—preferably non-magnetic—partition wall 12 can be provided approximately in the center of the rotor 3 and/or the rotor 3 and the stator 1. With respect to its cross section, this is embodied like the bulkhead elements 11 in accordance with FIG. 21 or FIG. 24. As a result, the air flows are decoupled from one another, preferably in terms of flow, on both sides of the partition wall 12 and a more uniform distribution of the cooling air over the entire axial length of the machine is achieved. The non-magnetic embodiment of the partition wall 12 avoids scatter losses.

FIGS. 3 to 12 each depict a conventional rotor lamination that depicts permanent magnets 22 in a wide variety of arrangements.

The flux blocking sections 14, 15, 16 each extend in the shape of an arc or the shape of a bowl to the respective q axis.

Like the conventional rotor laminations in accordance with FIGS. 3 to 12, the intermediate elements 7 contain cutouts, which are referred to as flux blocking sections and which also convey the air in the axial direction through the rotor 3. Laminations in accordance with FIG. 13 to FIG. 15, which enable the air in the flux blocking sections to exit respective flux blocking section and the rotor 3 radially, are provided at predetermined axial intervals. The cutouts 9 shown there extend at least from a flux blocking section, which functions as an axial cooling channel, as far as the outer diameter of the laminated rotor core of the rotor 3, i.e. as far as the air gap 19. In this embodiment, each cutout 9 between two d axes forms a cooling channel 6—thus, with a four-pole reluctance rotor, four cooling gaps 6 are present after each component laminated core.

Accordingly, in the case of a six-pole or eight-pole reluctance rotor, there are six or eight cooling gaps after each component laminated core.

The cutout 10 in the conventional rotor lamination in accordance with FIG. 3 to FIG. 12 on the outer side of the rotor 3 also serves as an externally-situated flux barrier on the rotor 3. This optional embodiment results in a further improvement of the power factor.

The externally-situated flux barrier 10 in the conventional rotor lamination in accordance with FIG. 3 to FIG. 12 can comprise air, but also non-magnetic material, in order to obtain a homogeneous air gap 19. This reduces the noise level, in particular in the case of high-revving machines.

The magnetically conductive intermediate elements 7 now additionally enable magnetic flux to be conveyed in the rotor 3. The inductance in the d axis of the rotor 3 is increased thereby. The comparatively better conductance now also enables the geometric dimensions of the flux barriers, in particular the radial height thereof, to be selected as comparatively larger, whereby the inductance in the q axis falls. As a result, overall, there is greater difference in the inductances of the d and q axis and the power factor of the synchronous reluctance machine 20 is improved.

An additional improvement of the power factor is achieved by the arrangement of at least one permanent magnet 22 in at least one flux barrier of at least one component laminated core and/or intermediate element 7.

The magnetically conductive intermediate elements 7, in particular of the rotor 3, can be manufactured with the same tools, for example the same punching tools, as the further laminations of the rotor 3. Additional machining of the laminations, for example additional punching processes or cutting processes can also be used to manufacture suitable larger cutouts 9 or spacers. The magnetically conductive intermediate elements 7 between two component laminated cores can be embodied not only as laminated, but also as solid one-piece parts, in particular as sintered parts.

In order to reduce the eddy current losses in the magnetic intermediate elements 7, these are also embodied as laminated. The number and/or axial thickness of the intermediate elements 7 arranged axially directly one behind the other produces the axial width of the cooling gap 6.

In order to additionally increase the difference between the inductances $L_q$ and $L_d$ in the q and d axis of the rotor 3, the axial length of the laminated core of the rotor 3 is selected as greater than the axial length of the laminated core of the stator 1. Herein, a 10% lengthening of the laminated rotor core compared to the laminated stator core has been found to be particularly suitable.

Figure 13:
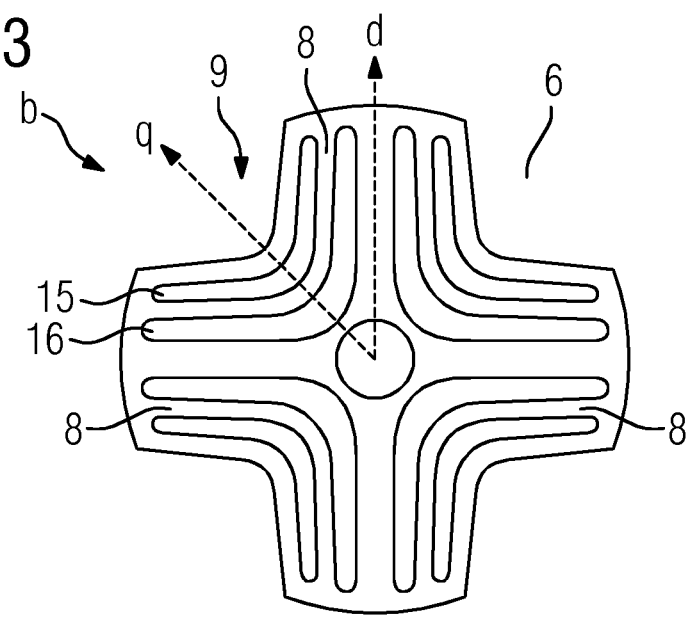
Figure 14:
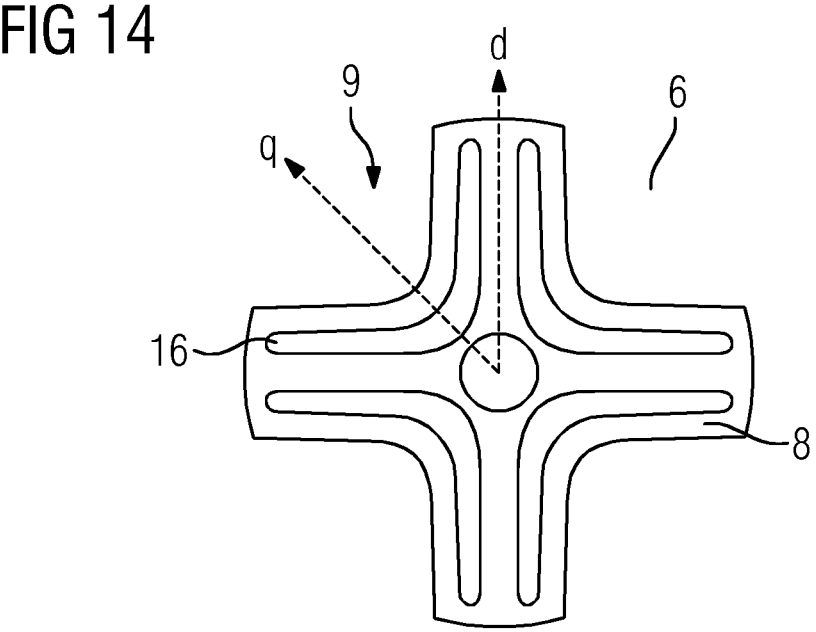
Figure 15:
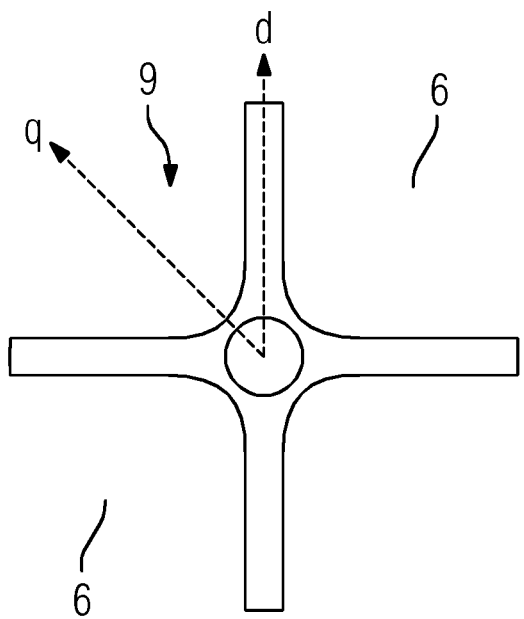
Figure 19:
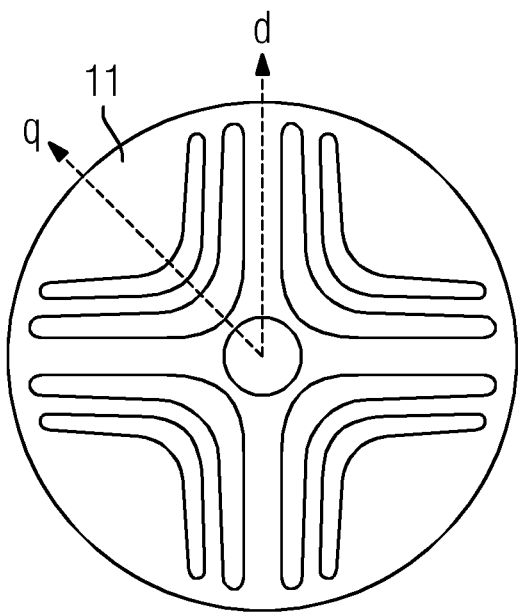
Figure 20:
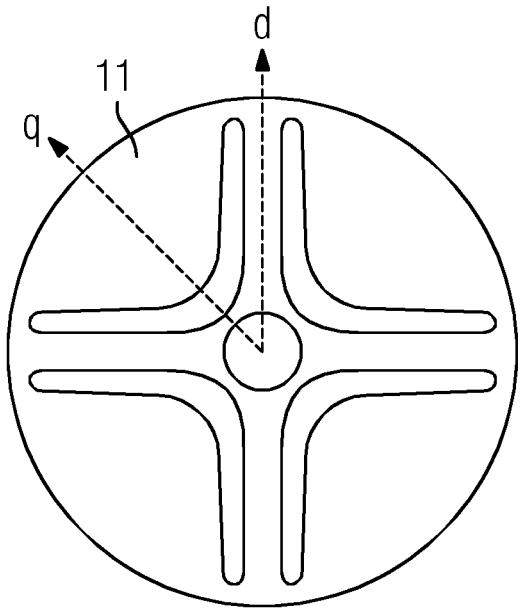
Figure 21:
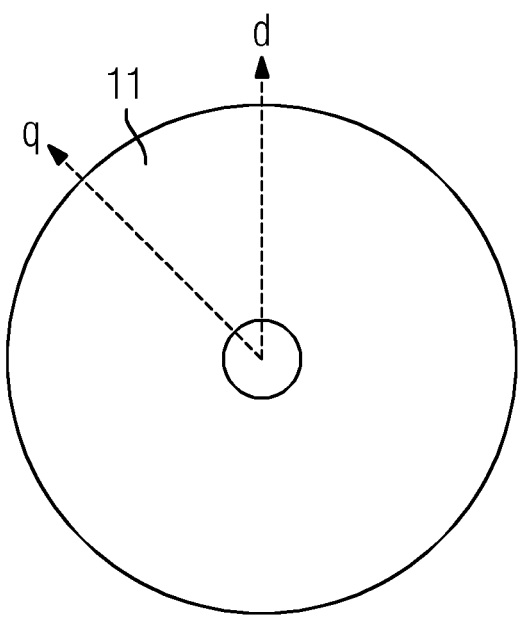

In order now to divert a cooling air flow explicitly into the radial cooling channels 6 of the rotor 3, independently of the embodiment in accordance with the synchronous reluctance machine 20 in accordance with FIG. 1, FIG. 2, or further conceivable embodiments, non-magnetically conductive bulkhead elements 11, for example in accordance with FIG. 19 to FIG. 21, are also located between the conventional laminations of the laminated rotor core in accordance with FIG. 3 to FIG. 12 and the magnetically conductive intermediate elements 7 in accordance with FIG. 13 to FIG. 15. These bulkhead elements 11 effect a radial diversion of at least one part air flow of a flux blocking section 14, 15, 16 into its respective radial cooling channel 6.

Figure 22:
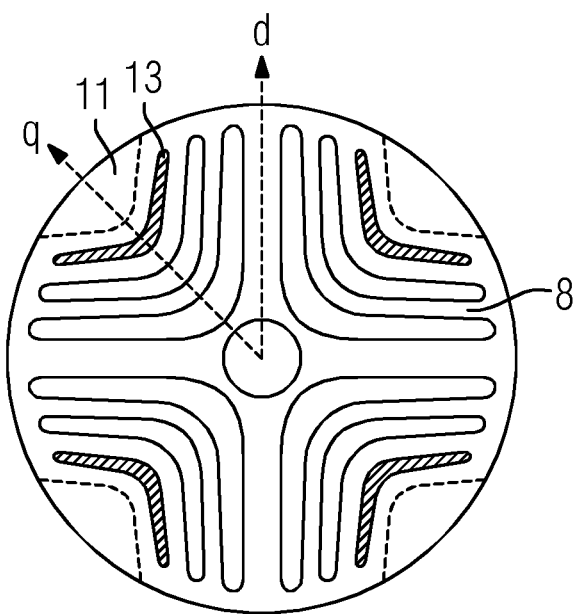
Figure 23:
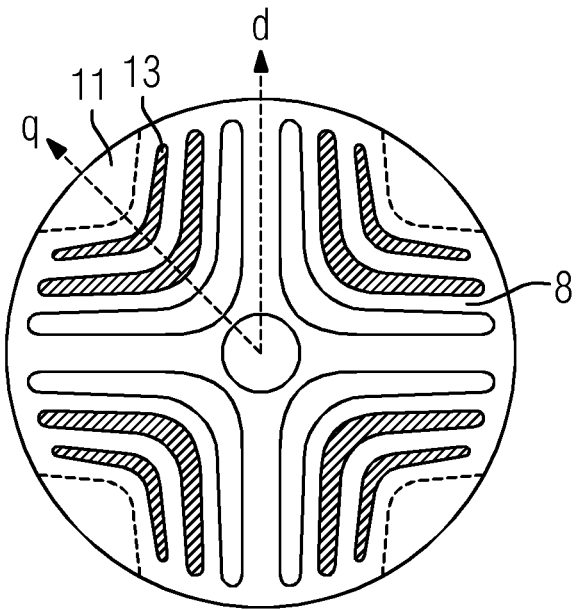
Figure 24:
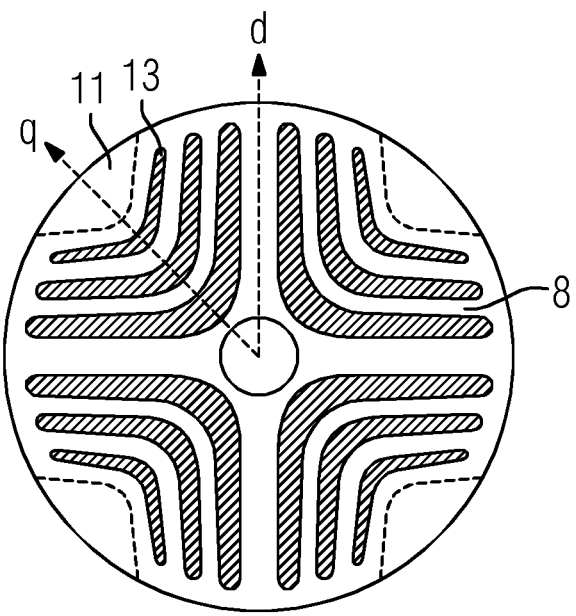

As an alternative to the bulkhead openings 11 in accordance with FIG. 19 to FIG. 21, laminations with cutouts in accordance with FIG. 3 to FIG. 12—i.e. magnetically conductive laminations, but without permanent magnets 22—can also be provided with a closure 13 in accordance with FIG. 22 to FIG. 24 in order to act as a bulkhead element 11. This closure 13 preferably consists of non-magnetically conductive material, such as, for example, plastic.

Cooling of the stator 1 with its winding system and the rotor 3 now takes place via radial cooling channels and/or axially-extending cooling channels and/or via the air gap 19. Additionally, the insertion of special intermediate elements 7 in accordance with FIG. 16 to FIG. 18 can also create an additional fan effect of the rotor 3. This takes place in particular due to the fact that the intermediate elements 7 are embodied in accordance with FIG. 16 to FIG. 18 with fan-like blades 14. These blades 14 can advantageously also simultaneously function as axial spacers between the component laminated cores 30, 31, 32, 33 of the rotor 3.

Figure 16:
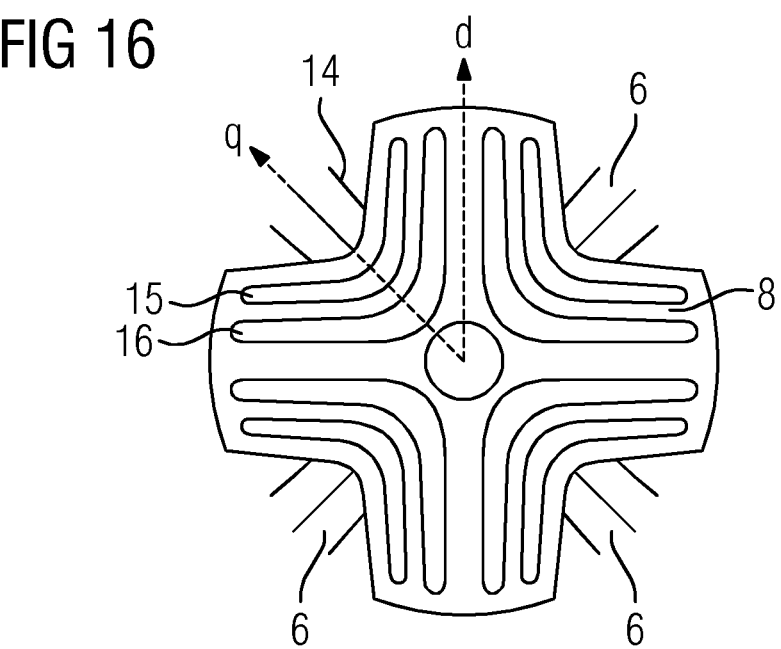
Figure 17:
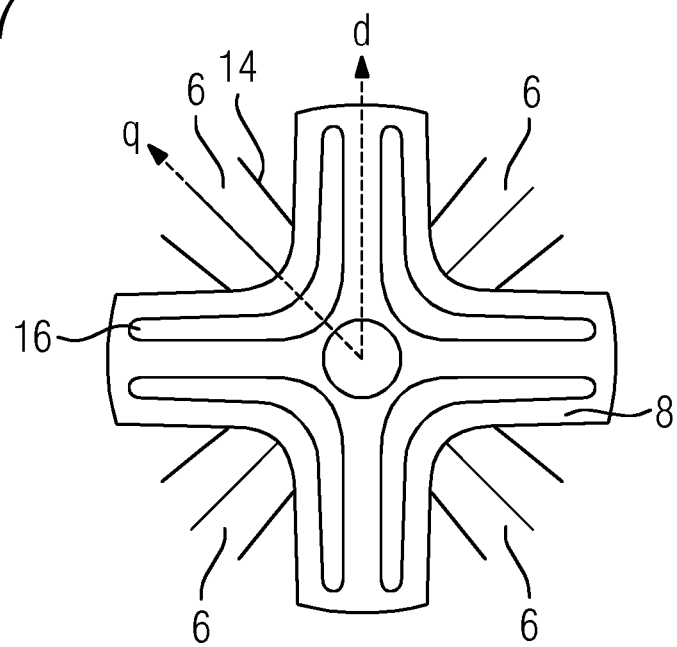
Figure 18:
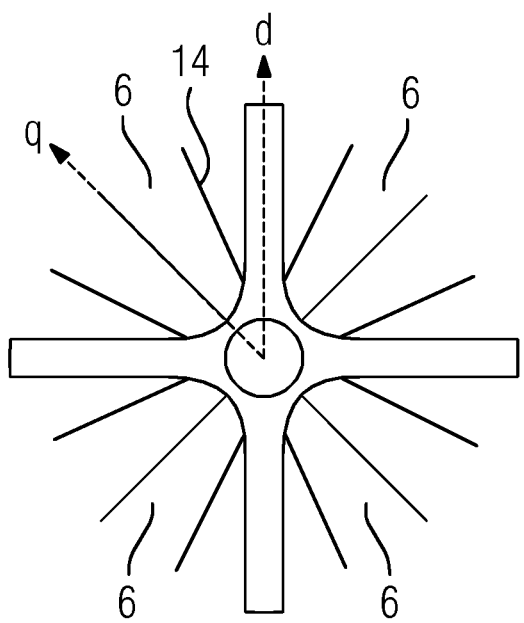

Accordingly, intermediate elements 7 in accordance with FIG. 13 to FIG. 15 and/or in accordance with FIG. 16 to FIG. 18 are also possible for each reluctance rotor.

In the case of a single-inlet machine in accordance with FIG. 1, the laminated core of the rotor 3 is now constructed axially as follows. A first component laminated core 30 is constructed with conventional laminations which are provided with permanent magnets 22 in accordance with one of the embodiments in accordance with FIG. 3 to FIG. 12. This is followed by an intermediate element 7 in accordance with FIG. 13, which has a predetermined axial thickness. However, it can also be embodied as laminated in one piece. This enables the cooling air flow from this flux blocking section 14 to be directed radially outward. This is then adjoined in its further axial course by a bulkhead element 11 in accordance with FIG. 19, FIG. 22, FIG. 25 or FIG. 27, which closes off the flux blocking section 14 axially completely or only partially. The flux blocking sections 15 and 16 remain partially axially open in this bulkhead element 11. At this point, no air exits radially outward from these flux blocking sections 15 and 16.

This is adjoined axially by a next component laminated core 31 with conventional laminations with permanent magnets 22 in accordance with FIG. 3 to FIG. 12. This is followed by an intermediate element 7 in accordance with FIG. 14, which has a predetermined axial thickness. However, it can also be embodied as laminated in one piece. This enables the cooling air flow from this flux blocking section 15 to be directed radially outward. It is also possible for a partial air flow from the flux blocking section 14 to be directed outward here. At this point, no air exits the flux blocking section 16 radially outward.

In the further axial course, this is then adjoined by a bulkhead element 11 in accordance with FIG. 20, FIG. 23, FIG. 26 or FIG. 28, which closes off the flux blocking section 14, 15 axially completely or only partially. With this bulkhead element, at least the flux blocking section 16 remains axially open.

Figure 29:
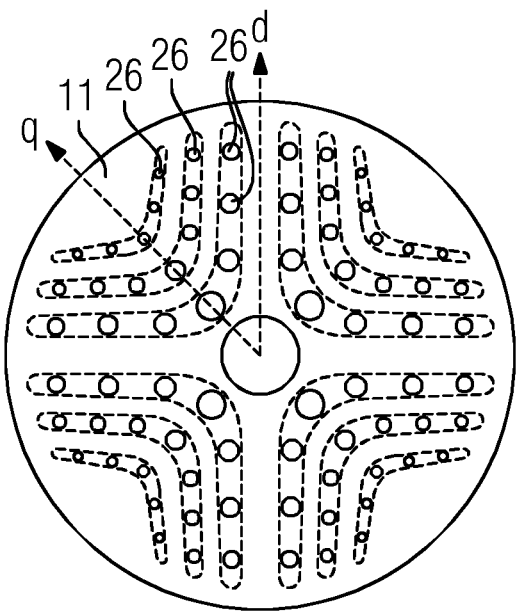

This is adjoined axially by a next component laminated core 32 with conventional laminations with permanent magnets 22 in accordance with one of FIG. 3 to FIG. 12. This is followed by an intermediate element 7 in accordance with FIG. 15, which has a predetermined axial thickness. However, it can also be embodied as laminated in one piece. This enables the cooling air flow from this flux blocking section 16 to be directed radially outward. This is then adjoined in its further axial course by a bulkhead element 11 in accordance with FIG. 21, FIG. 24, or FIG. 29, which inter alia closes off the flux blocking section 16 axially completely or only partially.

Also—where present—a partial air flow of the flux blocking sections 14, 15 can be diverted outward here. At this point, the air from this flux blocking sections 16 in each case exits its cooling channel 6 completely or is at least partially conveyed axially onward, ultimately, in this case axially out of the laminated core of the rotor 3.

If the bulkhead elements 11 only partially divert the axial air flow, the "residual air flow" remaining in this flux blocking section can be conveyed radially and/or axially into the bulkhead openings 11 of the other flux blocking sections located downstream in flow terms.

At least in the region of the d axis, the laminated core of the rotor 3 of these embodiments is axially continuous. Flux barriers 14, 15, 16 flanking the d axis are additionally present depending upon the axial position in the laminated core of the reluctance rotor.

The above-described structure from the two end faces of the rotor 3 up to partition wall 12 and the cooling principle can be transferred to a two-inlet machine in accordance with FIG. 2. Herein, ideally the partition wall 12 forms the bulkhead element, which divides the two cooling air flows flowing toward one another and diverts them radially toward the air gap 19.

The generated cooling air flow through flux blocking sections 14, 15, 16 can in principle be provided by shaft-mounted fans and/or external fans.

The inventive embodiment of the synchronous reluctance machine 20 with a frequency converter and the higher power factor of this dynamo-electric machine associated therewith enables this to be also used as a high-speed generator in a wind power plant, the thermal behavior of which can be optimized by the arrangement of a heat exchanger 17.

Laminated cores or component laminated cores 30, 31, 32, 33 should also be understood to be one-piece solid parts that are also magnetically conductive.

Depending upon the requirements imposed in the industrial environment of the synchronous reluctance machine 20 or in the case of energy generation by the synchronous reluctance machine 20, the reluctance rotor is in particular fitted with the laminations, intermediate elements 7 or bulkhead openings 11 that ensure the best power factor. Thus, a "mixture" of the above-described embodiments of laminations, intermediate elements 7 and bulkhead openings 11 is possible with single-inlet and dual-inlet machines and also with other cooling concepts.

The intermediate elements 7 that still have flux barriers in their axial course have not yet "transitioned" into cooling gaps 6 can also be fitted with permanent magnets 22 in accordance with arrangements such as those in FIG. 3 to FIG. 12.

The permanent magnets 22 used can be, for example, NdFeB, SaCO or ferrite, NdFeB magnets permit high flux densities while ferrite magnets are comparatively inexpensive.

Figure 30:
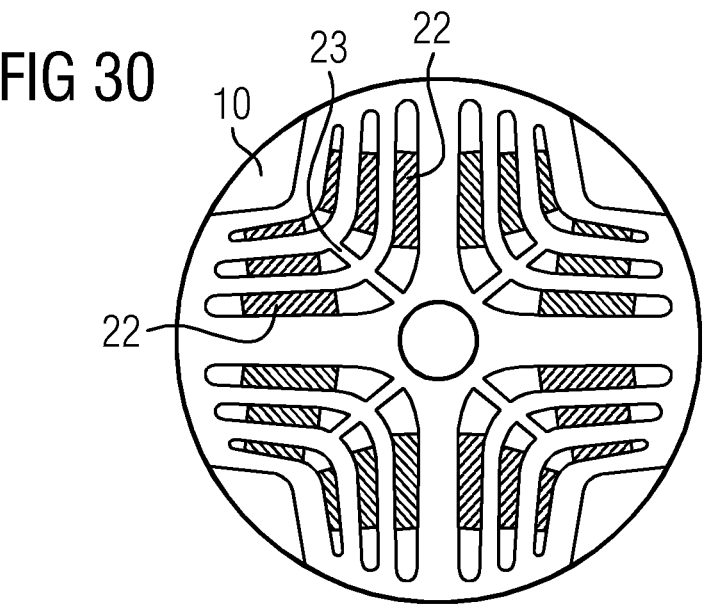
Figure 31:
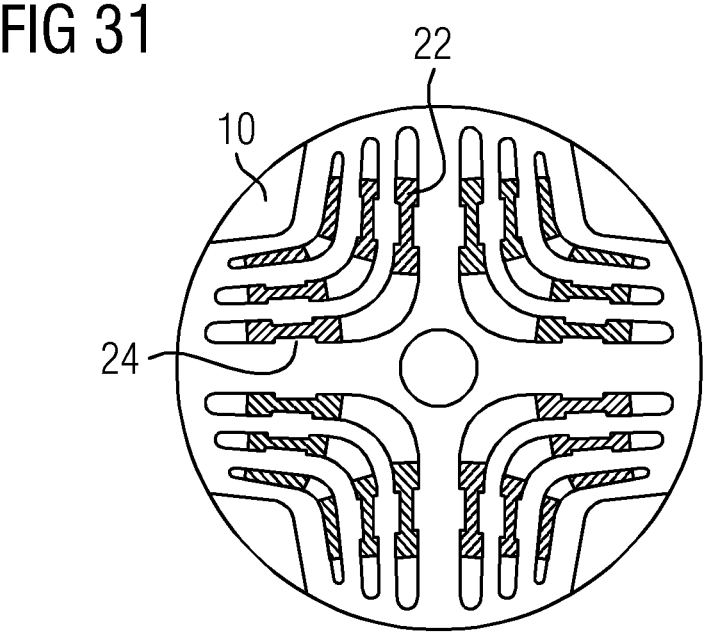

Since high centrifugal forces act on the flux conducting sections 8, at least one or more flux blocking sections 14, 15, 16 are interrupted by bars 23 in accordance with FIG. 30. Permanent magnets 22 can also carry out this function in that they establish a positive connection between the adjacent flux conducting sections 8 arranged radially one above the other. Thus, the positive connection can, for example, be established by a dovetail connection in accordance with FIG. 31. Combinations of the embodiments in accordance with FIG. 30 and FIG. 31 are conceivable in order to be able to absorb higher centrifugal forces.

Moreover, it is advantageous for the permanent magnets 22 to be used not only as rigid elements in the flux blocking sections but also as a suspension that, as a viscous mass, is only cured in the flux blocking sections 14, 15, 16, fills these optimally and thus also creates a positive connection.

The invention claimed is:

1. A synchronous reluctance machine, in particular a motor or generator, having a power greater than 300 kW, said synchronous reluctance machine comprising:
    a stator;
    a rotor disposed in spaced-apart relation to the stator by an air gap and mounted for rotation about an axis, said rotor including a laminated core having laminations arranged axially one behind one another and each having an anisotropic magnetic structure formed by flux blocking sections and flux conducting sections, with the flux blocking sections and the flux conducting sections forming poles of the rotor, said flux blocking sections configured to form axially extending channels, said laminated core being axially subdivided into a plurality of component laminated cores in the presence of radial cooling gaps between the poles in a region of a q axis as viewed in a circumferential direction and between neighboring ones of the component laminated cores as viewed axially, said cooling gaps opening into the air gap between the stator and the rotor; and
    permanent magnets provided in at least some of the flux blocking sections such as to not completely occupy the flux blocking sections, respectively, thereby allowing an axial airflow in all of the flux blocking sections,
    wherein at least one of the flux blocking sections is interrupted by bars and/or the permanent magnets establish a positive connection between the adjacent flux conducting sections arranged radially one above the other.

2. The synchronous reluctance machine of claim 1, wherein the positive connection is a dovetail connection.

3. The synchronous reluctance machine of claim 1, wherein the permanent magnets are arranged symmetrically to the q axis within the flux blocking sections, respectively.

4. The synchronous reluctance machine of claim 1, wherein the permanent magnets are arranged radially one above the other in a plurality of the flux blocking sections.

5. The synchronous reluctance machine of claim 1, wherein, within the flux blocking sections, permanent magnets form a positive connection with surrounding laminations.

6. The synchronous reluctance machine of claim 1, wherein the cooling gaps, as viewed from the air gap, have a radial extent which at most corresponds to a radial distance between the flux blocking sections and the air gap.

7. The synchronous reluctance machine of claim 1, wherein the radial cooling gaps between the component laminated cores of the rotor are formed by intermediate elements.

8. The synchronous reluctance machine of claim 1, wherein a number of the radial cooling gaps is at least n-1, wherein n is a number of the component laminated cores of the rotor.

9. The synchronous reluctance machine of claim 1, wherein the stator comprises radial cooling slots which are positioned at least in sections radially above the radial cooling gaps of the rotor.

10. The synchronous reluctance machine of claim 1, wherein the radial cooling gaps comprise elements for guiding an axially and/or radial cooling flow in the rotor.

11. The synchronous reluctance machine of claim 7, wherein the intermediate elements in the radial cooling gaps of the rotor are configured such as to support during operation of the synchronous reluctance machine a fan effect in a radial direction and/or an axial direction.

12. The synchronous reluctance machine of claim 1, wherein the laminated core of the rotor has an axial length which is greater than an axial length of the stator.

13. A wind power plant, comprising:
    a nacelle;
    a heat exchanger provided in or on the nacelle;
    a generator embodied as a reluctance machine which comprising a stator, a rotor disposed in spaced-apart relation to the stator by an air gap and mounted for rotation about an axis, said rotor including a laminated core having laminations arranged axially one behind one another and each having an anisotropic magnetic structure formed by flux blocking sections and flux conducting sections, with the flux blocking sections and the flux conducting sections forming poles of the rotor, said flux blocking sections configured to form axially extending channels, said laminated core being axially subdivided into a plurality of component laminated cores in the presence of radial cooling gaps between the poles in a region of a q axis as viewed in a circumferential direction and between neighboring ones of the component laminated cores as viewed axially, said cooling gaps opening into the air gap between the stator and the rotor, and permanent magnets provided in at least some of the flux blocking sections such as to not completely occupy the flux blocking sections, respectively, thereby allowing an axial airflow in all of the flux blocking sections, wherein at least one of the flux blocking sections is interrupted by bars and/or the permanent magnets establish a positive connection between the adjacent flux conducting sections arranged radially one above the other; and a frequency converter disposed in electrically conductive connection with the generator, wherein cooling air flows flow through the generator and/or frequency converter.

14. The wind power plant of claim 13, wherein the permanent magnets are arranged symmetrically to the q axis within the flux blocking sections, respectively.

15. The wind power plant of claim 13, wherein the permanent magnets are arranged radially one above the other in a plurality of the flux blocking sections.

16. The wind power plant of claim 13, wherein the cooling gaps, as viewed from the air gap, have a radial extent which at most corresponds to a radial distance between the flux blocking sections and the air gap.

17. The wind power plant of claim 13, wherein the radial cooling gaps between the component laminated cores of the rotor are formed by intermediate elements.

18. The wind power plant of claim 13, wherein a number of the radial cooling gaps is at least n-1, wherein n is a number of the component laminated cores of the rotor.

19. The wind power plant of claim 13, wherein the stator comprises radial cooling slots which are positioned at least in sections radially above the radial cooling gaps of the rotor.

20. The wind power plant of claim 17, wherein the intermediate elements in the radial cooling gaps of the rotor are configured such as to support during operation of the synchronous reluctance machine a fan effect in a radial direction and/or an axial direction.

* * * * *